United States Patent
Visweswara-Sastry

(10) Patent No.: US 12,496,893 B2
(45) Date of Patent: Dec. 16, 2025

(54) COUPLING ARRANGEMENT FOR A GENERATOR SET

(71) Applicant: Cummins Inc., Columbus, IN (US)

(72) Inventor: Prashanth Visweswara-Sastry, Columbus, IN (US)

(73) Assignee: Cummins Inc., Columbus, IN (US)

( * ) Notice: Subject to any disclaimer, the term of this patent is extended or adjusted under 35 U.S.C. 154(b) by 280 days.

(21) Appl. No.: 17/969,114

(22) Filed: Oct. 19, 2022

(65) Prior Publication Data
US 2023/0202285 A1    Jun. 29, 2023

Related U.S. Application Data

(60) Provisional application No. 63/294,293, filed on Dec. 28, 2021.

(51) Int. Cl.
*B60K 6/365* (2007.10)
*B60K 6/46* (2007.10)
*F16H 37/04* (2006.01)
*F16H 57/02* (2012.01)

(52) U.S. Cl.
CPC .............. *B60K 6/46* (2013.01); *B60K 6/365* (2013.01); *F16H 37/041* (2013.01); *F16H 2057/0203* (2013.01); *F16H 2057/02034* (2013.01)

(58) Field of Classification Search
CPC .. F16H 1/20; F16H 2001/2872; F16H 37/041; F16H 2057/02073; F16H 2057/0203; F16H 1/28; F16H 2057/02034; F16H 2057/085; B60K 6/46; B60K 6/365; B60K 2006/4833; H02K 7/116

USPC .............. 475/5, 348; 180/65.22, 65.245; 74/572.1, 572.5
See application file for complete search history.

(56) References Cited

U.S. PATENT DOCUMENTS

| | | | | |
|---|---|---|---|---|
| 4,346,624 A | * | 8/1982 | Nagasaki | F16F 15/315 475/159 |
| 5,428,274 A | * | 6/1995 | Furutani | B60K 6/46 903/917 |
| 7,293,543 B1 | * | 11/2007 | Scekic | F16H 57/04 123/198 R |
| 7,302,875 B2 | * | 12/2007 | Fukuchi | F16H 1/227 74/730.1 |
| 8,920,284 B2 | * | 12/2014 | Fox | F16C 43/04 475/346 |
| 2010/0052442 A1 | * | 3/2010 | Savant | H02K 7/116 310/78 |
| 2011/0029179 A1 | * | 2/2011 | Miyazaki | B60L 15/007 701/22 |
| 2013/0065718 A1 | * | 3/2013 | Munoz | B60K 6/36 475/5 |

(Continued)

OTHER PUBLICATIONS

CN 111749785A and english translation; Sep. 24, 2024 (Year: 2024).*

*Primary Examiner* — Roger L Pang
(74) *Attorney, Agent, or Firm* — Faegre Drinker Biddle & Reath LLP

(57) ABSTRACT

A coupling arrangement for coupling an engine to a generator in a generator set for use in a powertrain of a series hybrid electric vehicle is disclosed. The coupling arrangement comprises a gearset. The gearset is an epicyclic gearset that comprises a ring gear, a sun gear, and one or more planetary gears.

19 Claims, 9 Drawing Sheets

(56) References Cited

U.S. PATENT DOCUMENTS

2014/0274562 A1\* 9/2014 Ukon ................. F16F 15/1478
475/269
2021/0131529 A1\* 5/2021 Base ....................... F16H 3/76
2021/0348674 A1\* 11/2021 Nelson ..................... H02K 7/10

\* cited by examiner

COUPLING ARRANGEMENT FOR A GENERATOR SET

CROSS-REFERENCE TO RELATED APPLICATION

This application claims the benefit of U.S. Provisional Application No. 63/294,293, filed on Dec. 28, 2021, the disclosure of which is hereby incorporated by reference herein in its entirety.

TECHNICAL FIELD

The present disclosure relates to a coupling arrangement for coupling an engine to a generator in a generator set, more particularly a generator set in the powertrain of a series hybrid electric vehicle.

BACKGROUND

Hybrid electric vehicles, such as cars, buses, vans, and trucks, combine an internal combustion engine with an electric propulsion system to achieve better fuel economy, lower emissions and/or better performance. In the case of a series hybrid electric vehicle, the wheels are driven by a traction motor which is powered either by a battery, an internal combustion engine, or both. The battery is typically in the form of a battery pack comprising a large number of individual electrochemical cells connected in series and parallel to achieve the target voltage. Typically, Lithium-ion (Li-ion) battery cells are used as they provide a relatively good cycle life and energy density. A generator set may be used to charge the battery and/or supply power to the traction motor and other vehicle accessories. Series hybrid electric vehicles may also be referred to as extended-range electric vehicles (EREVs) or range-extended electric vehicles (REEVs).

The generator set for a series hybrid electrical vehicle typically comprises an internal combustion engine and a generator. In use, the engine drives the generator in order to generate electrical power. It may also be possible for the generator to be used as a motor to start the engine. Therefore, it may be necessary to couple the engine to the generator. Typically, this is achieved using a coupling comprising an elastomeric component or a spring-based coupler. Such couplers provide some torsional decoupling between the engine and the generator.

In a conventional generator set, the coupling between the engine and the generator has a 1:1 coupling ratio, such that the engine and the generator operate at the same speed. However, this may result in either the engine or the generator, or both, operating at a speed which is outside of its most efficient operating range. For example, internal combustion engines (ICEs) are typically most efficient at a speed of between 2,000 and 4,000 rpm, whereas generators are typically most efficient at 10,000 rpm or higher.

In order to address the above disadvantage, it would be possible to incorporate a gearbox between the engine and the generator. However, the addition of a gearbox would increase the overall length of the powertrain, which would be disadvantageous in hybrid vehicle applications where space may be limited.

SUMMARY

According to an embodiment of the present disclosure, there is provided a coupling arrangement for coupling an engine to a generator in a generator set for use in a powertrain of a series hybrid electric vehicle, the coupling arrangement comprising a gearset, wherein the gearset is an epicyclic gearset comprising a ring gear, a sun gear and one or more planetary gears.

In at least some embodiments, by providing a coupling arrangement with an epicyclic gearset comprising a ring gear, a sun gear and one or more planetary gears, it may be possible to couple the engine and the generator using a gearing ratio which allows the engine and the generator to operate at different speeds. This may allow the engine and/or the generator to operate at a more efficient speed than would otherwise be the case, and may allow more cost effective components to be used. Furthermore, in at least some embodiments, this may be achieved without significantly increasing the axial length of the generator set and/or while providing torsional decoupling between the engine and the generator.

In at least some embodiments, the epicyclic gearset includes at least two planetary gears. For example, the gearset may include 3 planetary gears, although, in other embodiments, it may include some other suitable number of planetary gears, such as 1, 2, 4, 5, 6 or more planetary gears. In an embodiment, by including multiple planetary gears, the stress on any one planetary gear is reduced, therefore reducing the chance of failure. Typically, epicyclic gearsets are more compact than a conventional gear train. Therefore, by utilising an epicyclic gearset the integration volume of the generator set may be reduced.

In at least some embodiments, the ring gear is arranged to be connected to a rotating component of the engine. For example, the ring gear may be connected to the flywheel of the engine, which may provide a convenient way of connecting the ring gear to a rotating component of the engine which is accessible to the coupling. However, the ring gear could alternatively be connected to another rotating component such as the crankshaft of the engine. In this way, the ring gear will rotate at the same speed as the operating speed of the engine.

In at least some embodiments, the sun gear is arranged to be connected to a rotating component of the generator. In some examples, the sun gear is arranged to be connected to the rotor shaft of the generator. Therefore, the sun gear may be arranged to rotate at the same speed as the operating speed of the generator.

The planetary gears may be arranged to be connected to the generator front plate which may help to minimize the number of components and/or reduce the amount of space required.

In at least some embodiments, the gearset is arranged such that the engine rotates at a slower speed than the generator. In embodiments, the gear ratio between the ring gear, connected to the engine, and the sun gear, connected to the generator, is at least 1:1.5, for example, between 1:1.5 and 1:10. In an embodiment, the gear ratio is between 1:2 and 1:5. In an embodiment, the gear ratio is approximately 1:3. In other embodiments, other suitable gear rations may be utilized.

This may provide the advantage that the engine and the generator may operate at different speeds. In an example, the engine may operate at one speed and the generator may operate at a different higher speed. By providing gear-ratios such as the above-mentioned gear ratios, the engine may operate at its peak efficiency, for example between 2000 to 4000 revolutions per minute (rpm), whilst the generator may operate at its peak efficiency, for example over 10000 rpm.

Furthermore, the size of the generator may be substantially reduced for a given torque rating, reducing costs and packing volume.

In at least some embodiments, the ring gear, planetary gears and sun gear are at least partially aligned in an axial direction. For example, the planetary gears may be radially inwards of and engage with the ring gear. The sun gear may be radially inwards of and engage with the planetary gears. The ring gear and the sun may have the same axis of rotation, which may be the same axis of rotation as the generator and/or the engine. The planetary gears may have axes of rotation which are different from but parallel to the axis of rotation of the ring gear and the sun gear. In at least some embodiments, such arrangements may help to provide a compact arrangement, and thus minimize the axial length of the generator set.

The ring gear may have teeth on its radially inwards periphery which engage with teeth on the outer periphery of the planetary gears. The sun gear may have teeth on its outer periphery which engage with teeth on the outer peripheries of the planetary gears. However, in either case, if desired, a friction coupling could be used instead.

According to another embodiment of the present disclosure, there is provided a generator set for use in a powertrain of a series hybrid electric vehicle, the generator set comprising an engine, a generator and a coupling arrangement which couples the engine to the motor/generator, the coupling arrangement comprising a gearset, wherein the gearset is an epicyclic gearset comprising a ring gear, a sun gear and one or more planetary gears, the ring gear is connected to the engine and the sun gear is connected to the generator.

In at least some embodiments, the engine comprises a crankshaft and a flywheel. In an example, the generator comprises a rotor shaft and a generator front plate.

In at least some embodiments, the ring gear is connected to a rotating component of the engine. In an example, the ring gear is connected to the flywheel of the engine. In another example, the ring gear is integral to the flywheel. In an embodiment of the present disclosure, the ring gear is bolted or otherwise connected directly onto the flywheel. This may provide the advantage that the integration volume of the gearset with the generator set is reduced, the rotational inertia is reduced and/or the number of components is reduced.

In at least some embodiments, the sun gear is connected to a rotating component of the generator. In an example, the sun gear is connected to the rotor shaft of the generator. In another example, the sun gear is mounted on the rotor shaft via a sun gear hub. The sun gear hub may be mounted on the rotor shaft via a toothed spline. This may help to minimize the number of components and/or reduce the amount of space required.

In at least some embodiments, the one or more planetary gears are connected to the generator front plate such that the one or more planetary gears may not orbit the sun gear. In an example, the one or more planetary gears are mounted on hubs. In another example, the one or more planetary gears are mounted on hubs and the hubs are integrated with the generator front plate. This may provide the advantage that the integration volume of the gearset with the generator is reduced and/or the number of components is reduced.

In at least some embodiments, the gearset is arranged such that the engine rotates at a slower speed than the generator. In an example, the gear ratio between the ring gear, connected to the engine, and the sun gear, connected to the generator, is at least 1:1.5, for example between 1:1.5 and 1:10. In another example, the gear ratio is between 1:2 and 1:5. For example, the gear ratio is approximately 1:3. In other embodiments, other suitable gear rations may be utilize.

By providing gear ratios such as the above-mentioned gear ratios, the engine may operate at its peak efficiency, for example between 2000 to 4000 revolutions per minute (rpm), whilst the generator may operate at its peak efficiency, for example over 10000 rpm. Furthermore, the size of the generator may be substantially reduced for a given torque rating, reducing costs and packing volume.

The generator set may further comprise a flywheel housing, and the gearset may be located radially inwards of the flywheel housing. This may help to provide ingress protection for both the flywheel and the gearset using a minimum number of components and/or while minimizing the axial length of the generator set.

In at least some embodiments, according to a further embodiment of the present disclosure, the axis of rotation of the engine's crankshaft and the axis of rotation of the generator's rotor shaft are colinear. This may provide the advantage that the generator set may have reduced vibration due to the crankshaft and the rotor shaft being offset. By having the crankshaft and the rotor shaft inline, there may be the further advantage that the minimum packing volume may be achieved.

According to another embodiment of the present disclosure, there is provided a powertrain for a series hybrid vehicle, the powertrain comprising a traction motor, an electrical energy storage device for supplying electrical power to the traction motor, and a generator set for supplying power to at least one of the traction motor, and the electrical energy storage device. The generator set comprises an engine, a generator and a coupling arrangement which couples the engine to the generator, the coupling arrangement comprising a gearset, wherein the gearset is an epicyclic gearset comprising a ring gear, a sun gear and one or more planetary gears. The ring gear is connected to the engine, and the sun gear is connected to the generator.

According to another embodiment of the present disclosure there is provided a method of coupling an engine to a generator in a generator set for use in a powertrain of a series hybrid electric vehicle, the method comprising providing a gearset between the engine and the generator, wherein the gearset is an epicyclic gearset comprising a ring gear, a sun gear and one or more planetary gears, connecting a rotating component of the engine to the ring gear, and connecting a rotating component of the generator to the sun gear.

Features of one embodiment of the disclosure may be used in combination with any other embodiment. Any of the apparatus features may be provided as method features and vice versa.

BRIEF DESCRIPTION OF DRAWINGS

Features of the present disclosure will now be described, purely by way of example, with reference to the accompanying drawings, in which.

DETAILED DESCRIPTION

Figure 1:
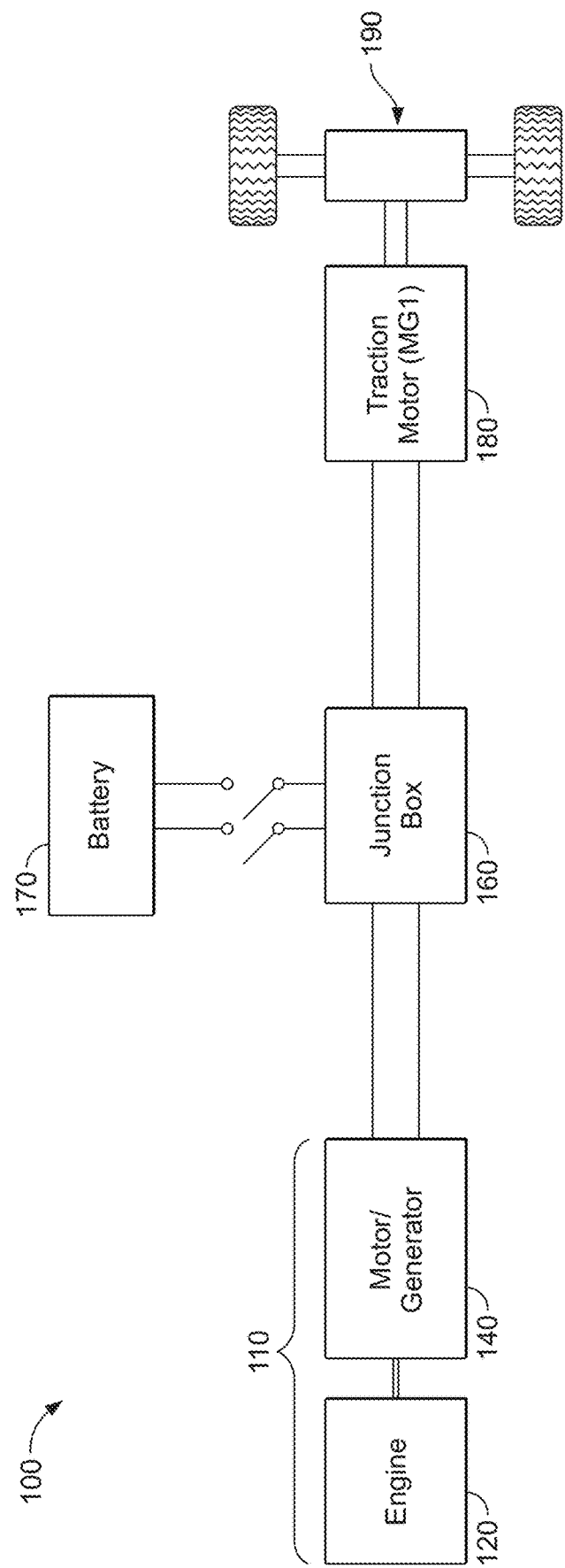
FIG. 1 shows parts of an exemplary hybrid powertrain system for a series hybrid electric vehicle.

FIG. 1 shows parts of an exemplary hybrid powertrain system for a series hybrid electric vehicle. Referring to FIG. 1, the powertrain system 100 comprises an engine 120, generator 140, junction box 160, battery 170, traction motor 180, and vehicle drivetrain 190. The engine 120 is mechanically connected to the generator 140 and is configured to drive the generator 140 to generate electrical energy. The engine 120 and generator 140 in combination are sometimes referred to herein as a generator set 110. The generator 140 may also operate as a starter motor to start the engine 120. The generator 140 may be electrically connected to the junction box 160 via a first inverter (not shown). The first inverter may be configured to convert an AC output from the generator 140 to DC to supply to the junction box 160. The junction box 160 is electrically connected to the battery 170. The junction box may also be electrically connected to the traction motor 180 via a second inverter (not shown). The second inverter may be configured to convert a DC voltage from the junction box 160 to AC to drive the traction motor 180. The traction motor 180 is mechanically connected to the vehicle drivetrain 190. The traction motor is used to drive the vehicle drivetrain 190 using electrical power from the battery 170 and/or the generator 140. The traction motor 180 may also operate as a generator and may use regenerative braking to convert mechanical power from the vehicle drivetrain 190 to electrical power to, for example, charge the battery 170. In this case, the second inverter may be used to convert an AC output from the traction motor 180, operating as a generator, to DC for supply to the battery 170 via the junction box 160. The vehicle drivetrain 190 may comprise a drive shaft and a differential connected to driven wheels, in a manner known in the art.

In operation, the traction motor 180 may be used to supply mechanical power to the vehicle drivetrain 190. Electrical power for the traction motor 180 may be supplied either from the generator set 110 or the battery 170. The traction motor 180 may also operate in regenerative braking mode to recover electrical energy from the vehicle's momentum and charge the battery 170. The engine 120 and generator 140 form the generator set 110 which is used to charge the battery 170 via the first inverter and junction box 160, and to provide power to the traction motor 180 via the first inverter, junction box 160 and second inverter. The battery 170 may also be charged from an external power source (plugin hybrid). The generator 140 may be used to start the engine 120 using power from the battery 170. Alternatively, a separate starter motor and/or a separate battery could be provided for this purpose.

In the series hybrid electric arrangement of FIG. 1, the engine 120 is isolated from the vehicle drivetrain 190. This allows the engine 120 to be switched off when not required and to operate at an efficient speed when in use.

In a conventional generator set, such as that shown in FIG. 1, the engine 120 is coupled to the generator 140 with a 1:1 coupling ratio, such that the engine 120 and the generator 140 operate at the same speed. However, this may result in either the engine 120 or the generator 140, or both, operating at a speed which is outside of its most efficient operating range. For example, internal combustion engines (ICEs) are typically most efficient at a speed of between 2,000 and 4,000 rpm, whereas generators are typically most efficient at 10,000 rpm or higher.

Figure 2:
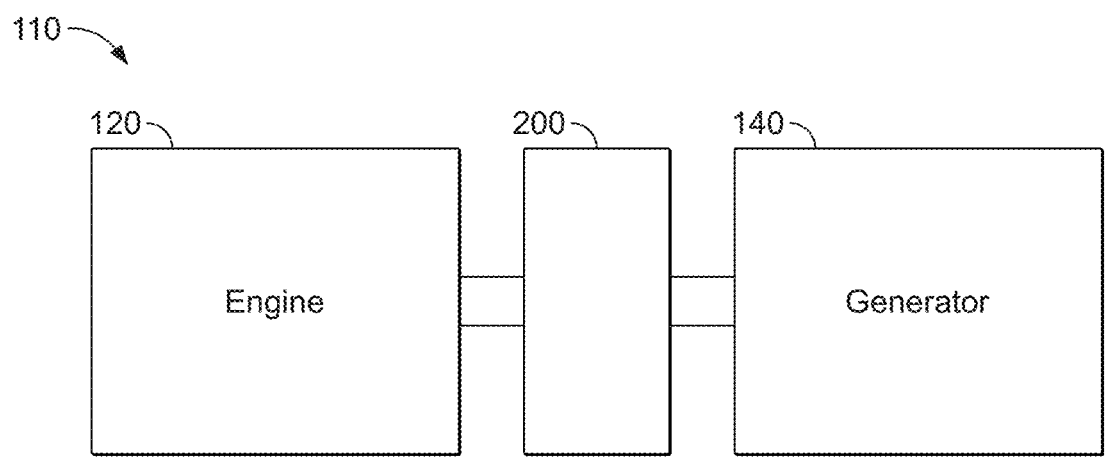
FIG. 2 shows parts of a generator set in an embodiment of the present disclosure.

FIG. 2 shows parts of a generator set according to an embodiment of the present disclosure. Referring to FIG. 2, the generator set 110 comprises an engine 120, a gearset 200 and a generator 140. The gearset 200 is arranged axially between the engine 120 and the generator 140. The engine 120 is mechanically connected to the generator 140 via the gearset 200. The gearset 200 is mechanically coupled to a rotating component of the engine and to a rotating component of the generator. The gearset 200 may be configured such that the engine 120 may operate at a slower speed than the generator 140. This may provide the advantages that the generator may be smaller for a given output torque whilst the engine may operate at its most efficient speed. Furthermore, in such a generator set 110, the generator 140 may also operate as a starter motor to start the engine 120.

In operation, the engine 120 may drive the generator 140 to generate electrical energy. The rotation of the engine crankshaft is transferred into rotation of the rotor shaft via the gearset 200 in order to generate electrical energy.

By coupling the engine 120 to the generator 140 using a gearset, the engine 120 may operate at a slower speed than the generator 140. This may provide the advantages that the generator may be smaller for a given output torque whilst the engine may operate at its most efficient speed. However, the addition of a gearset would increase the overall length of the powertrain, which would be disadvantageous in hybrid vehicle applications where space may be limited.

In an embodiment of the present disclosure, an epicyclic gear set arrangement is provided for coupling the engine 120 to the generator 140. Features of the epicyclic gearset arrangement, according to some embodiments, are described below.

Figure 3:
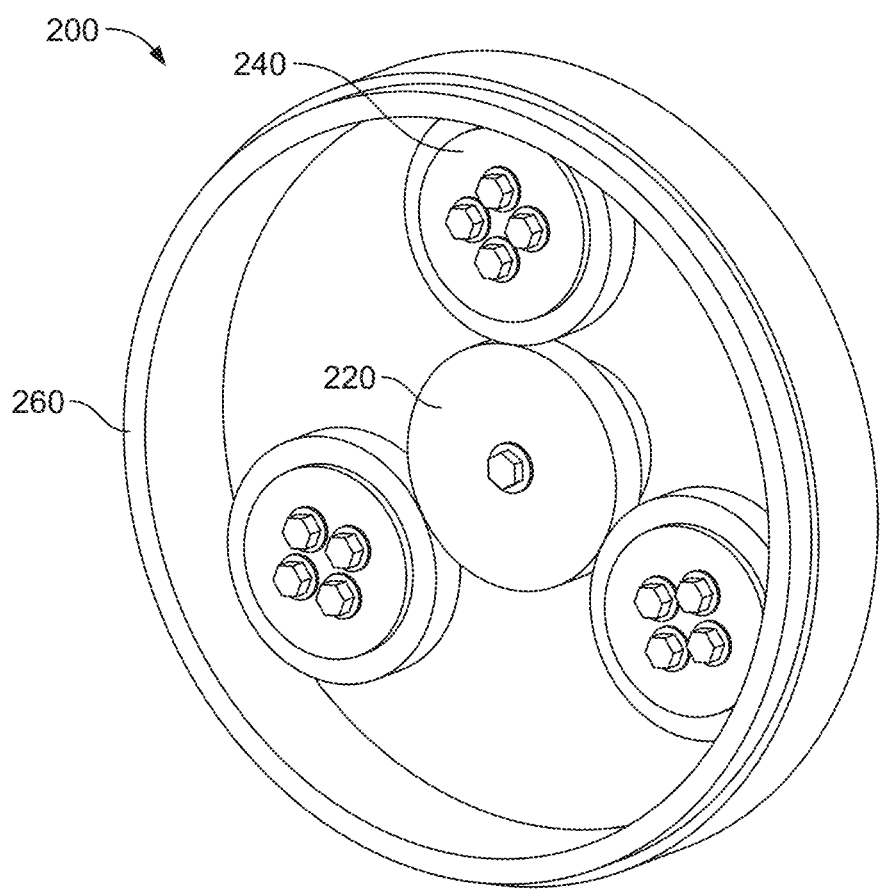
FIG. 3 shows an epicyclic gearset arrangement in an embodiment of the present disclosure.

FIG. 3 shows parts of an exemplary epicyclic gearset arrangement for coupling an engine 120 to a generator 140. Referring to FIG. 3, an epicyclic gearset 200 comprises a sun gear 220, a plurality of planetary gears 240 and a ring gear 260. The plurality of planetary gears 240 may be mounted on a carrier (not shown), such that each of the planetary gears 240 orbits the sun gear 220 at the same speed. The sun gear 220 may be mechanically connected to the plurality of planetary gears 240 such that rotation of the sun gear 220 causes corresponding rotation of the plurality of planetary gears 240. For example, the sun gear may have teeth on its outer periphery which engage with teeth on the outer periphery of the planetary gears, or alternatively a friction coupling could be used. The plurality of planetary gears 240 may be mechanically connected to the ring gear 260 such that rotation of the planetary gears 240 causes corresponding rotation of the ring gear 260. For example, the ring gear may have teeth on its inner periphery which engage with teeth on the outer periphery of the planetary gears, or a friction coupling could be used. The gearset may have one, two, three or more planetary gears 240. An input shaft (not shown) may be mechanically connected to one of the ring gear 260, the carrier, or the sun gear 220. An output shaft may be connected to a different one of the ring gear 260, the carrier, or the sun gear 220. One of the ring gear 260 or the carrier may be held stationary, preventing rotation. In an embodiment of the present disclosure, the ring gear 260 is mechanically connected to a rotating component of the engine 120 such that the ring gear 260 rotates at the same speed as the operating speed of the engine 120. The sun gear 220 may be mechanically connected to a rotating component of the generator 140, such as the rotor shaft, such that the sun gear 220 rotates at the same speed as the operating speed of the generator 140. In an embodiment, the axes of the planetary gears 240 are stationary with respect to the generator, such that the planetary gears may rotate about their central axes but do not orbit the sun gear 220.

In operation, the engine 120 transfers mechanical power to the gearset 200 via the ring gear 260. Rotation of the ring gear 260 causes the plurality of planetary gears 240 to rotate about their central axes, in the same direction as the rotation of the ring gear 260. Rotation of the planetary gears 240 causes rotation of the sun gear 220 in the opposite direction to the rotation of the planetary gears 240. Rotation of the sun gear 220 transfers mechanical power to the generator. When the generator is operating as a motor, for example to start the engine, then mechanical power transfer is in the opposite direction.

The gearset of FIG. 3 may be located between the engine 120 and the generator 140 in an axial direction to form a generator set. Further features of a generator set according to an embodiment of the present disclosure will be described below.

Figure 4:
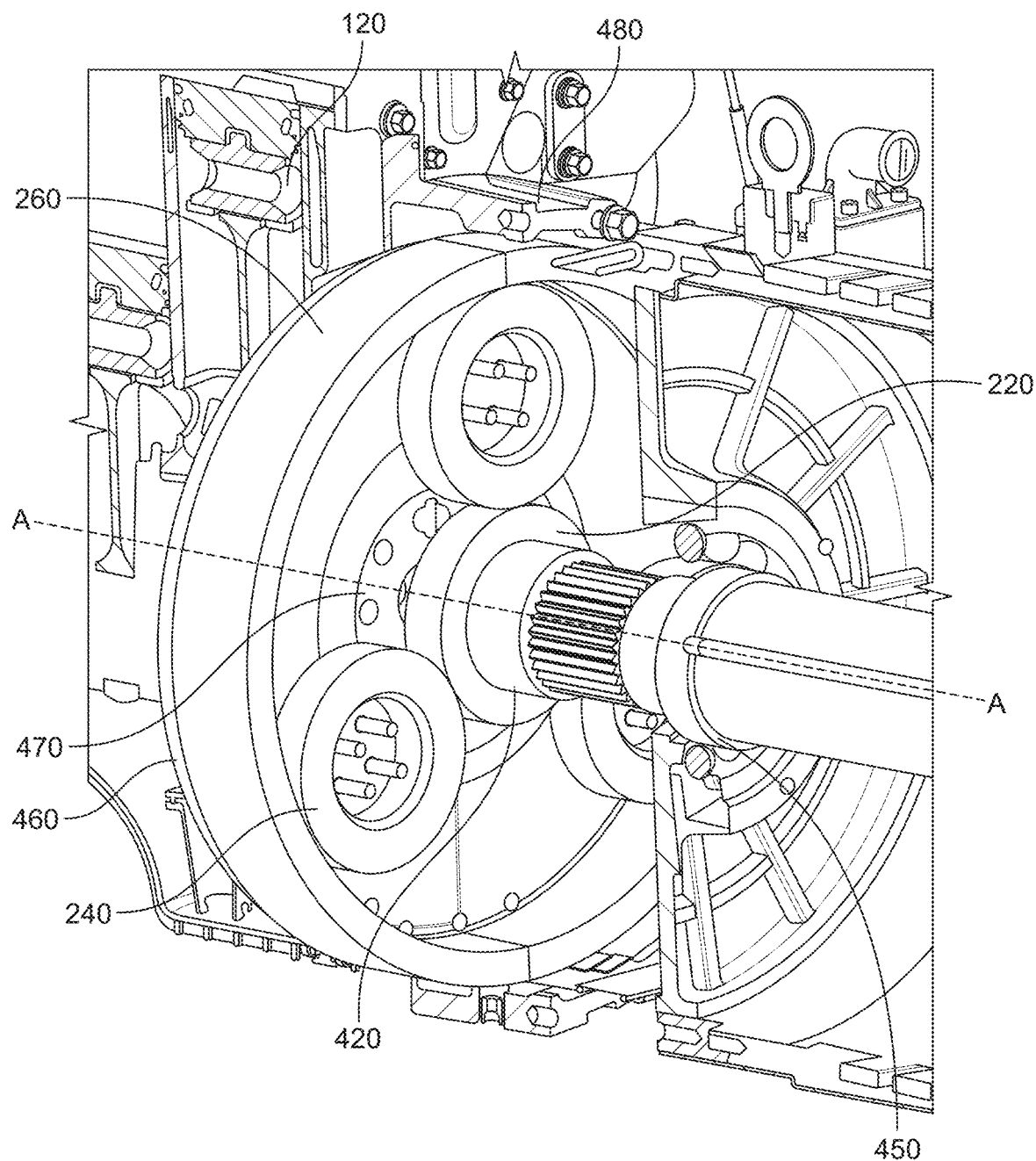
FIG. 4 shows a cutaway view of a generator set assembly according to an embodiment of the present disclosure.
Figure 5:
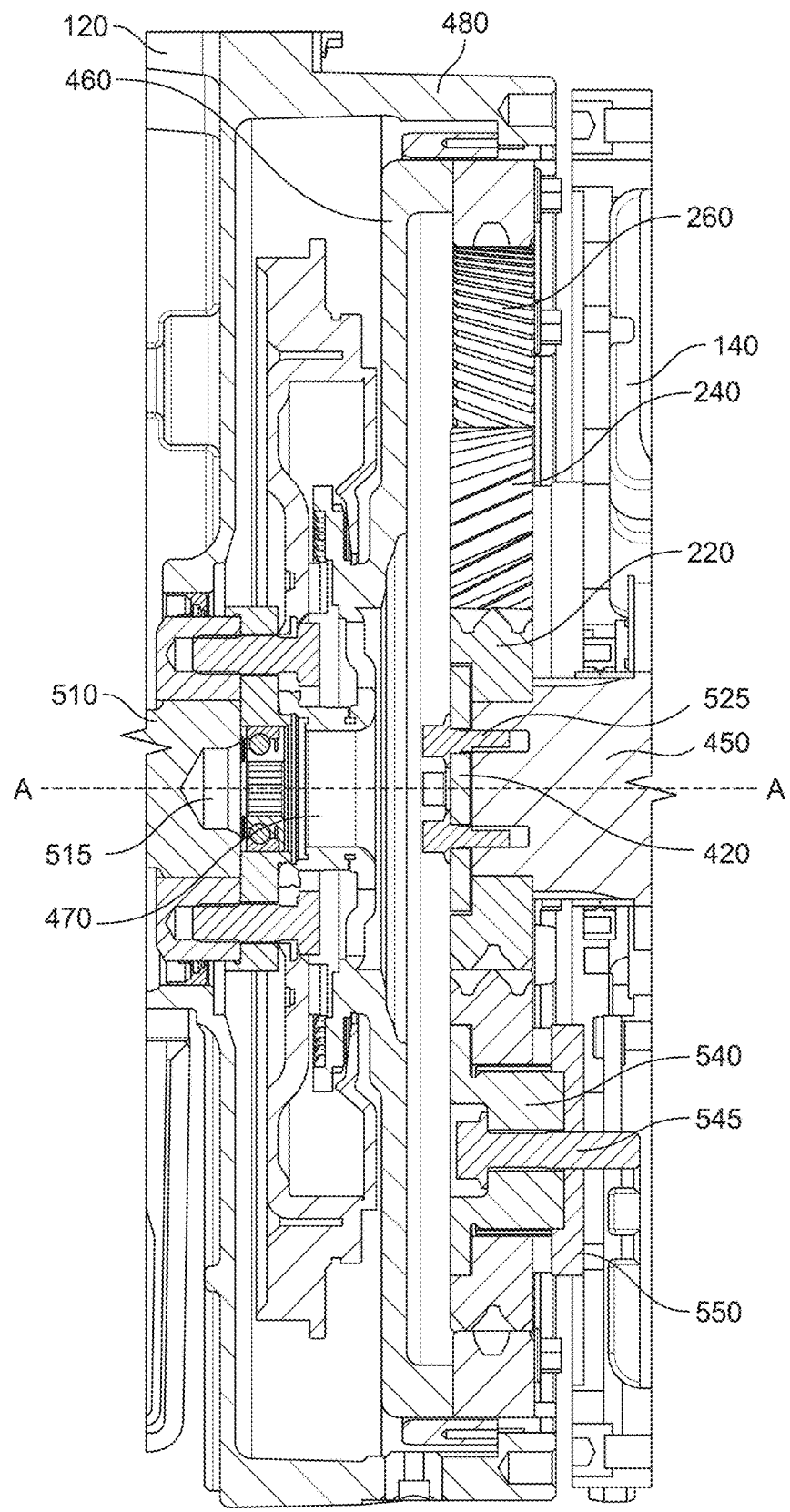
FIG. 5 shows a sectional view of a generator set assembly according to an embodiment of the present disclosure.

FIGS. 4 and 5 show parts of a generator set assembly according to an embodiment of the present disclosure. FIG. 4 is a cutaway view of the generator set assembly and FIG. 5 is a sectional view of the generator set assembly along axis AA. Referring to FIGS. 4 and 5, the generator set 110 comprises an engine 120, a coupling, and a generator 140. The engine comprises a crankshaft, a flywheel 460 and a flywheel housing 480. The generator 140 comprises a generator front plate and a rotor shaft 450. The coupling may be located radially inside the flywheel housing 480. The coupling may be formed from a gearset comprising a ring gear 260, a plurality of planetary gears 240 mounted on planetary gear hubs (not shown) and a sun gear 220 mounted on a sun gear hub 420. The flywheel 460 comprises a flywheel hub 470 which may be mechanically connected to the crankshaft 510 of the engine 120 via a flywheel mounting 515. The flywheel 460 may be connected to the crankshaft such that rotation of the crank shaft causes rotation of the flywheel 460. The ring gear 260 may be rigidly connected to an axial face of the flywheel 460 such that relative rotation between the ring gear 260 and the flywheel 460 is prevented. The flywheel assembly, according to an embodiment, is described in more detail below. The ring gear 260 may be arranged to engage with the plurality of planetary gears 240, such that rotation of the ring gear causes rotation of the planetary gears 240. The planetary gears 240 may be mounted on planetary gear hubs 540 which may be connected to the generator front plate via bolts 545. The planetary gear hubs 540 may be mounted on planetary gear mounting points 550 on the generator front plate (not shown). The planetary gear hubs feature bearings such that each of the planetary gears 240 may rotate about their respective axis but do not orbit the sun gear 220. The planetary gears 240 may be arranged to engage with the sun gear 220 such that rotation of the planetary gears 240 causes rotation of the sun gear 220. The sun gear 220 may be rigidly connected to the rotor shaft 450 of the generator via the sun gear hub 420 and sun gear hub bolts 525. The bolts 525 may pass through apertures in the sun gear hub 420 into corresponding recesses in the face of the rotor shaft 450. The sun gear hub 420 may be axially mounted on the rotor shaft 450 such that relative rotation between the sun gear hub 420 and the rotor shaft 450 is prevented. In FIG. 4, the sun gear hub 420 is shown to be mounted on the rotor shaft 450 via a toothed spline, however any other suitable connecting means may be utilised. The flywheel housing 480 may be mechanically connected to the engine 120 and the generator (not shown) via bolts and is configured to circumferentially surround the flywheel 460, ring gear 260, planetary gears 240 and sun gear 220.

In operation, the crankshaft 510 drives the flywheel 460, causing rotation of the flywheel 460 and the ring gear 260. The ring gear 260 engages with the planetary gears 240, resulting in rotation of the planetary gears 240 in the same direction as the rotation of the ring gear 260. The planetary gears 240 further engage with the sun gear 220, causing the sun gear 220 to rotate in the opposite direction to the rotation of the planetary gears 240. Rotation of the sun gear 220 causes rotation of the rotor shaft 450. The generator set may operate in reverse to the above description such that rotation of the rotor shaft 450 drives rotation of the crankshaft. In the above embodiment, the rotation of the ring gear 260 is slower than the rotation of the sun gear 220, such that the engine operates at one speed and the generator operates at a different, higher speed.

Figure 6:
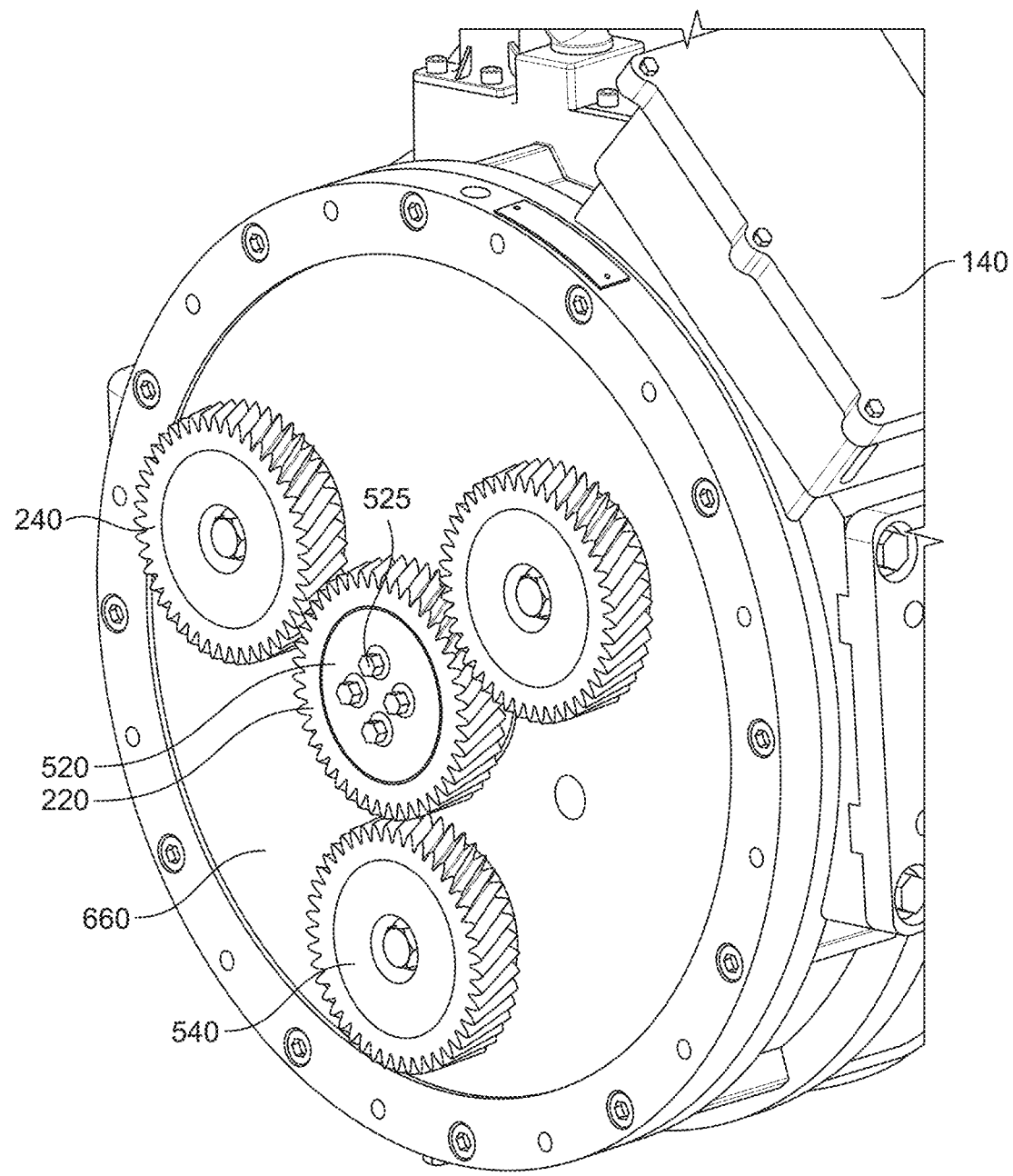
FIG. 6 shows generator according to an embodiment of the present disclosure.
Figure 7:
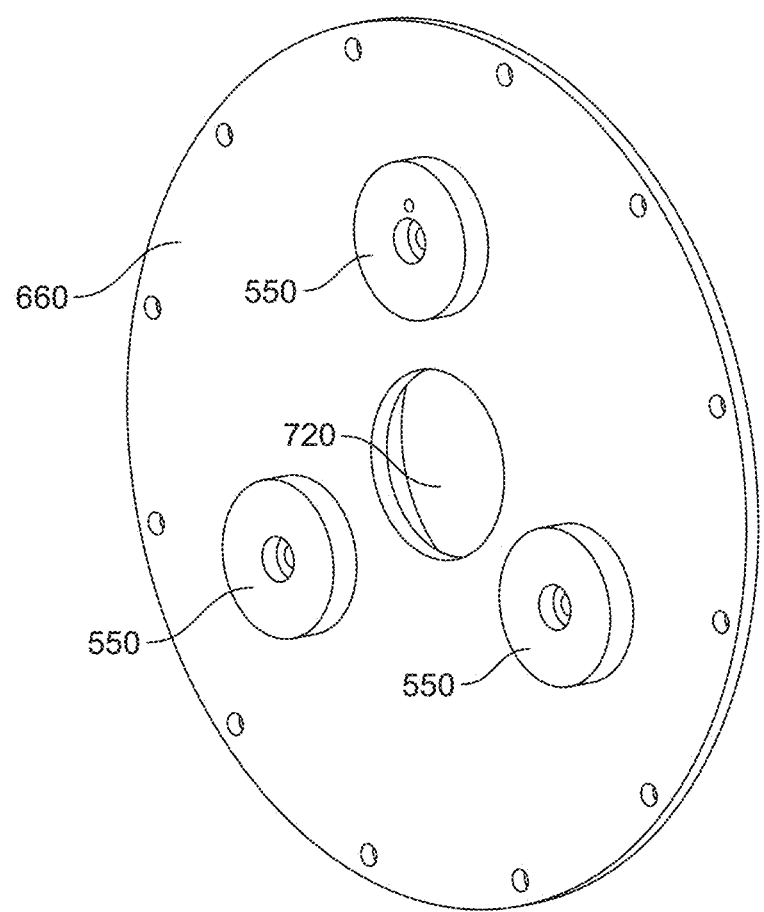
FIG. 7 shows a generator front plate according to a further embodiment of the present disclosure.

FIGS. 6 and 7 show parts of a generator in an embodiment of the present disclosure. Referring to FIG. 6, the generator 140 comprises a generator front plate 660, a plurality of planetary gears 240 and a sun gear 220. The generator front plate 660 is bolted to the generator housing. However, it would be possible for the front plate to be integral with the generator housing. The planetary gears 240 are each mounted on a planetary gear hub 540 via a bolt 545. The planetary gear hubs 540 are mounted on planetary gear mounting points 550 on the generator front plate 660. The planetary gear hubs may feature bearings such that each of the planetary gears 240 may rotate about their respective axis but may not orbit the sun gear 220. Furthermore, the planetary gears 240 may have a plurality of gear teeth arranged circumferentially around the perimeter of the planetary gears 240. The sun gear 220 may be mounted on a sun gear hub 520 via a plurality of sun gear hub bolts 525. The sun gear hub 520 may be mounted on the rotor shaft as described above such that there is no relative rotation between the rotor shaft and the sun gear hub 520. The sun gear 220 comprises a plurality of gear teeth that may be arranged circumferentially around the perimeter of the sun gear 220. In an embodiment, the sun gear teeth are arranged to engage with the planetary gear teeth.

Referring now to FIG. 7, the generator comprises a generator front plate 660 which forms the front of the generator housing. The generator front plate comprises an aperture 720 and a plurality of planetary gear mounting points 550. The aperture 720 is located concentrically with the generator front plate 660. The aperture may be arranged such that the sun gear hub 420 and rotor shaft 450 protrude axially through the aperture. In FIG. 7, the aperture 720 is shown to be circular, however the aperture may be any other suitable shape, for example square or elliptical. The planetary gear mounting points 550 may protrude axially from the face of the generator front plate 660 and are spaced symmetrically around the central axis of the generator front plate. Each of the planetary gear mounting points 550 may comprise a recess for acceptance of a planetary gear mounting bolt. In FIG. 7 the planetary gear mounting points are shown to be substantially circular in cross-section, however their cross-section may be square, triangular or any other suitable shape.

In at least some embodiments, by mounting the planetary gears 240 and the sun gear 220 on the generator front plate 660 the axial length of the generator set may be reduced. Further improvements, which may be used, in some embodiments, in combination with or instead of the features described in FIGS. 6 and 7, will now be described with reference to FIGS. 8A, 8B and 9.

Figure 8A:
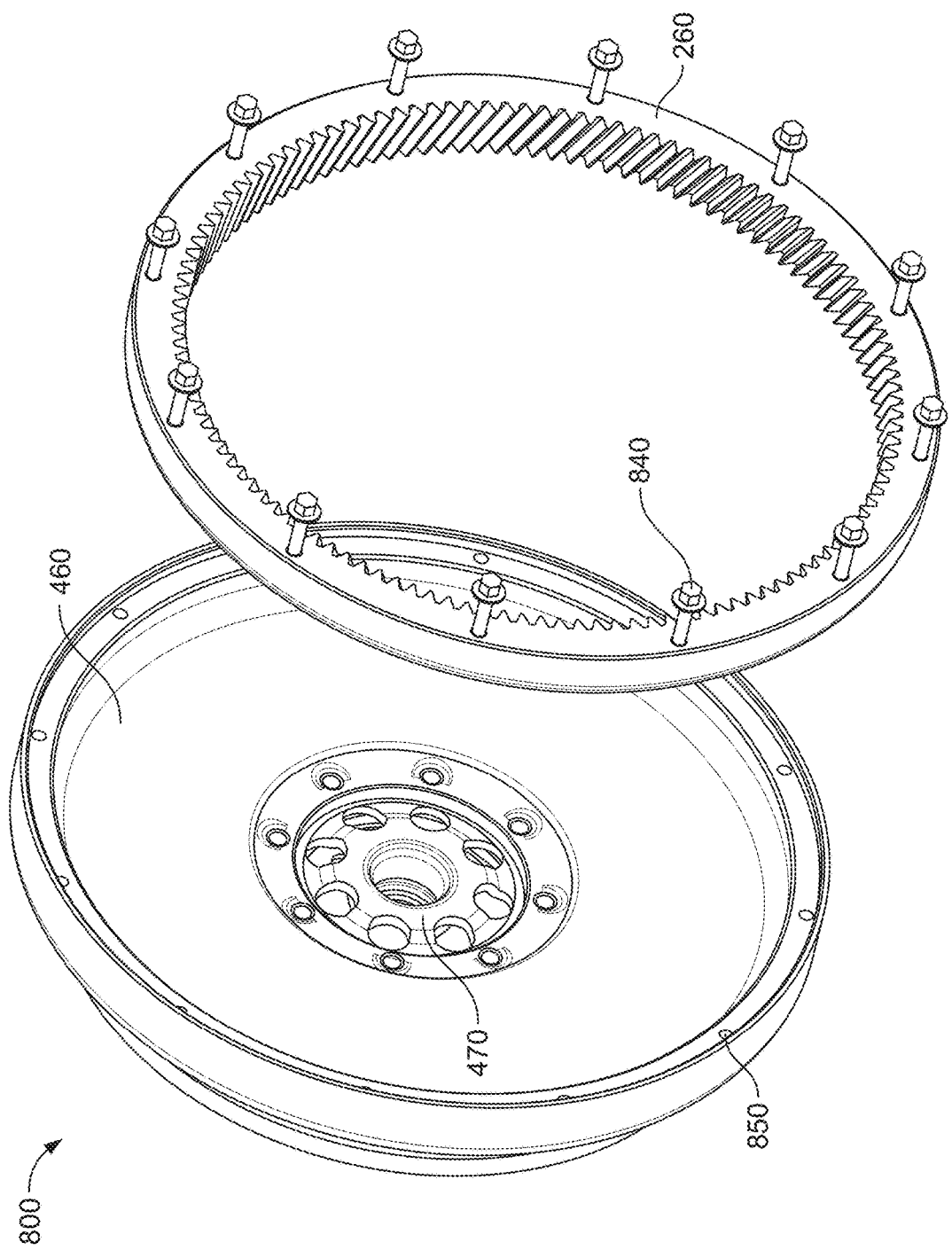
FIG. 8A shows an exploded view of a flywheel assembly according to an embodiment of the present disclosure.
Figure 8B:
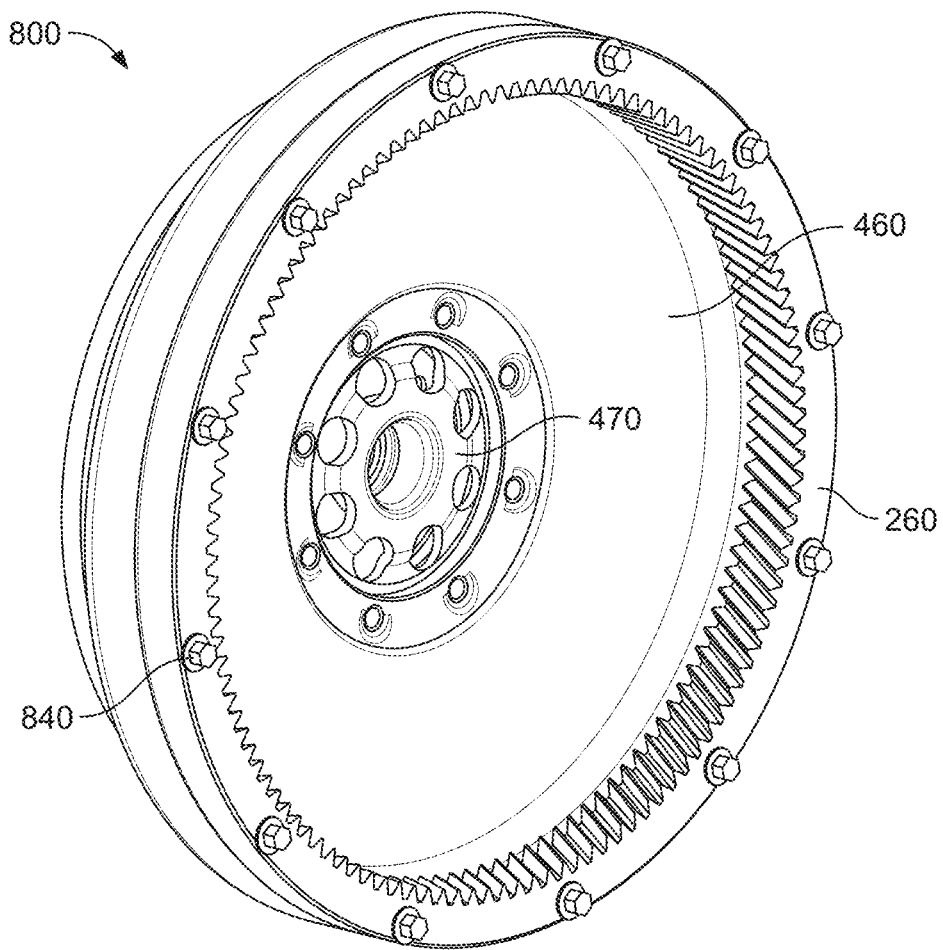
FIG. 8B shows a flywheel assembly according to an embodiment of the present disclosure.
Figure 9:
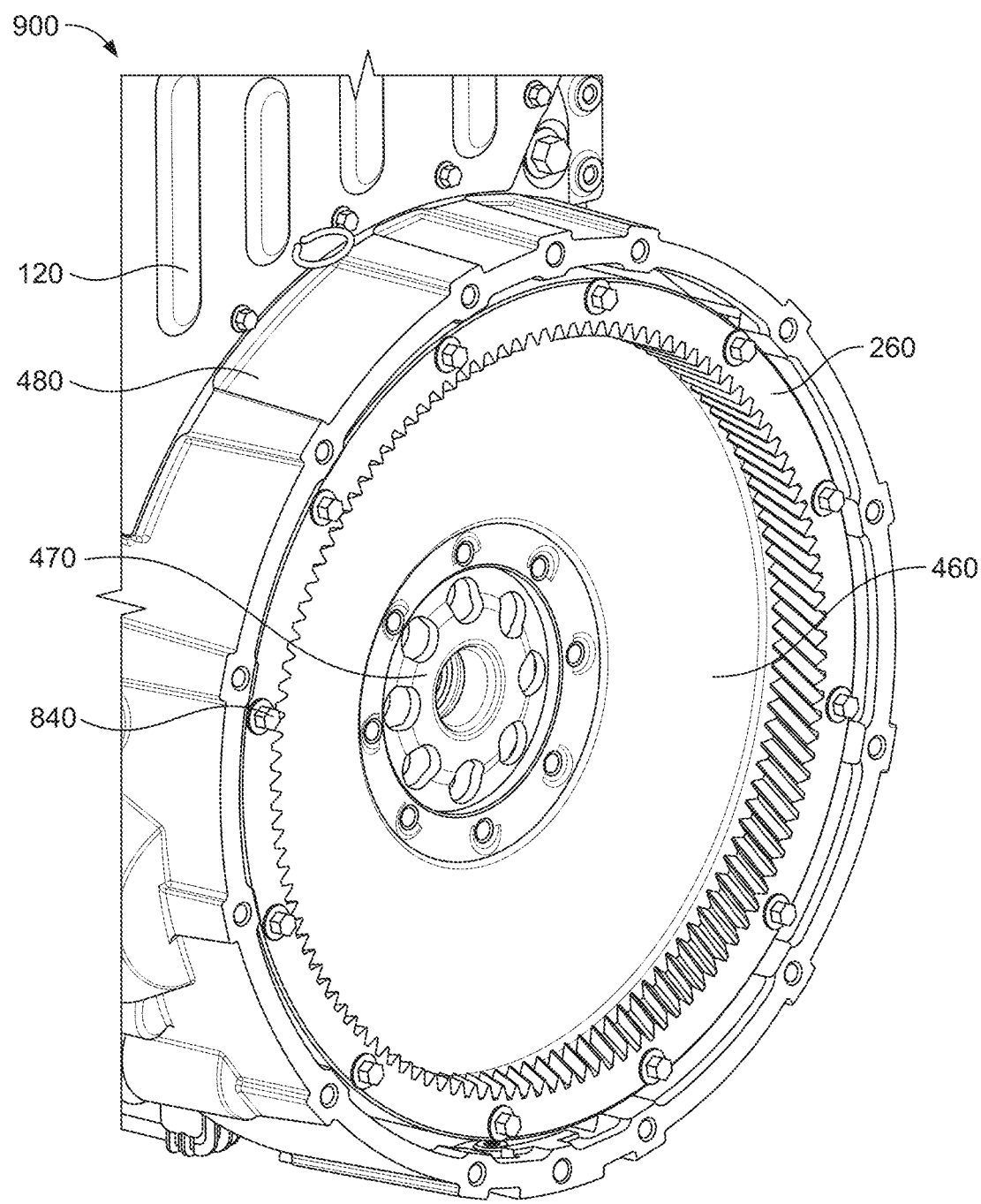
FIG. 9 shows an engine assembly according to a further embodiment of the present disclosure.

FIGS. 8A, 8B and 9 show an engine in an embodiment of the present disclosure. FIGS. 8A and 8B show an exploded and assembled view of a flywheel assembly respectively. FIG. 9 shows an engine assembly according to an embodiment of the present disclosure. The flywheel assembly, according to an embodiment, will now be described.

Referring to FIG. 8A, an example flywheel assembly 800 comprises a flywheel 460 and a ring gear 260. The flywheel comprises a flywheel hub 470 and a plurality of bolt holes 850. The flywheel hub 470 may be arranged concentrically with the flywheel 460. In operation, the flywheel mounting point is mechanically connected to the crankshaft of the engine 120 via a flywheel hub mounting. The flywheel is arranged to rotate at the same speed as the engine crankshaft. The bolt holes 850 may be located on an axial face of the flywheel 460 and are at a radially distal end of the flywheel 460. The bolt holes 850 may be symmetrically spaced around the axis of rotation of the flywheel 460. The ring gear 260 may be in the form of a hollow disc. The ring gear 260 may comprise a plurality of teeth on a radially inward surface of the hollow disc. In an embodiment, the ring gear teeth may cover the full thickness of the flywheel 460 in an axial direction. The ring gear 260 may further comprise a plurality of holes (not shown) running axially through the entire thickness of the ring gear 260. A plurality of bolts 840 may protrude through the holes in the flywheel 460. The bolt holes 850 in the flywheel 460 may be configured to align with the holes in the ring gear, such that the bolts 840 rigidly connect the ring gear 260 to the flywheel 460. Referring now to FIG. 8B, an assembled view of the example flywheel assembly 800, according to an embodiment, is shown. The ring gear 260 is rigidly connected to the flywheel 460 by the bolts 840. When assembled, the ring gear 260 is connected to the flywheel 460 such that there is no relative rotation between the two components. The ring gear 260 is connected to an axial face of the flywheel 460 and is axially offset from the flywheel mounting 470.

Referring now to FIG. 9, an example engine assembly 900 comprises an engine 120, a flywheel 460, a ring gear 260 and a flywheel housing 480. The flywheel housing 480 may be substantially ring shaped with a hollow interior and comprises bolt holes for connecting the flywheel housing 480 to the generator 140. The flywheel housing 480 may be mechanically connected to the engine 120 and may be configured to surround the flywheel 460 and the ring gear 260 circumferentially. The flywheel housing 480 may be designed to protect the flywheel 460 and the ring gear 260. As described above with reference to FIGS. 8A and 8B, the flywheel 460 may comprise a flywheel hub 470 and a plurality of bolt holes (not shown). The flywheel hub 470 may be mechanically connected to the crankshaft of the engine (not shown) via a flywheel hub mounting 515. The flywheel 460 may be connected to the crankshaft via the flywheel hub 470 in such a way that rotation of the crankshaft causes rotation of the flywheel, or vice versa. The ring gear 260 may be rigidly connected to the flywheel 460 by the bolts 840. In an embodiment, when assembled, the ring gear 260 is connected to the flywheel 460 such that there is no relative rotation between the two components. The ring gear 260 is connected to an axial face of the flywheel 460 and is axially offset from the flywheel mounting 470.

In at least some embodiments, by mounting the ring gear 260 on the flywheel 460, the axial length of the generator set 110 may be reduced. Furthermore, the need for a gearset housing is removed as the flywheel housing 480 may protect both the flywheel 460 and the gearset.

In the above embodiments, the gear ratio between the ring gear 260 and the sun gear 220 may be between 1:1.5 and 1:5. In an embodiment, the gear ratio is approximately 1:3, such that a single rotation of the ring gear translates to three rotations of the sun gear. Therefore, the engine may run at a lower operating speed than the generator. This may provide the advantage that the generator may be smaller, and therefore less expensive, as well as more efficient. By integrating either the ring gear 260 into the flywheel 460 or the planetary gears 240 into the generator front plate 660, the axial length of the generator set 110 may be reduced. In an embodiment, both the ring gear 260 and the planetary gears 240 are integrated into the flywheel 460 and the generator front plate 660 respectively, thereby achieving the smallest possible overall axial length. Furthermore, the epicyclic gearset may provide some torsional decoupling between the engine and the generator, thereby removing (or reducing) the need for an elastomeric or spring-based coupling.

It will be appreciated that the features of the disclosure have been described above by way of example only, and that variations in detail may be made within the scope of the appended claims.

The invention claimed is:

1. A coupling arrangement for coupling an engine to a generator in a generator set for use in a powertrain of a series hybrid electric vehicle, the coupling arrangement comprising a gearset, wherein the gearset is an epicyclic gearset comprising a ring gear, a sun gear, and one or more planetary gears, wherein an outer circumference of the ring gear is same as an outer circumference of a flywheel of the engine, and the ring gear is axially fixed at the outer circumference of the flywheel.

2. The coupling arrangement of claim 1, wherein the sun gear is arranged to be connected to a rotating component of the generator.

3. The coupling arrangement of claim 2, wherein the sun gear is arranged to be connected to a rotor shaft of the generator.

4. The coupling arrangement of claim 1, wherein the planetary gears are arranged to be connected to a generator front plate.

5. The coupling arrangement of claim 1, wherein a gear ratio between the ring gear and the sun gear is between 1:2 and 1:5.

6. The coupling arrangement of claim 1, wherein the ring gear, the planetary gears, and the sun gear are at least partially aligned in an axial direction.

7. The coupling arrangement of claim 1, wherein the ring gear has a plurality of bolt holes that align with a plurality of bolt holes of the flywheel of the engine, and the bolt holes of the ring gear and the bolt holes of the flywheel receive a plurality of bolts that connect the ring gear onto the flywheel.

8. A generator set for use in a powertrain of a series hybrid electric vehicle, the generator set comprising an engine, a generator, and a coupling arrangement which couples the engine to the generator, the coupling arrangement comprising a gearset, wherein:

the gearset is an epicyclic gearset comprising a ring gear, a sun gear, and one or more planetary gears;

an outer circumference of the ring gear is same as in outer circumference of a flywheel of the engine, and the ring gear is axially fixed at the outer circumference of the flywheel; and the sun gear is connected to the generator.

9. The generator set of claim 8, wherein the ring gear is integral with the flywheel.

10. The generator set of claim 8, wherein the generator comprises a rotor shaft and a generator front plate.

11. The generator set of claim 10, wherein the sun gear is connected to the rotor shaft.

12. The generator set of claim 10, wherein the one or more planetary gears are connected to the generator front plate.

13. The generator set of claim 12, wherein the one or more planetary gears are mounted on hubs.

14. The generator set of claim 13, wherein the hubs are integrated with the generator front plate.

15. The generator set of claim 8, wherein a gear ratio between the ring gear and the sun gear is between 1:2 and 1:5.

16. The generator set of claim 8, further comprising a flywheel housing, wherein the gearset is located radially inwards of the flywheel housing.

17. The generator set of claim 8, wherein an axis of rotation of a crankshaft of the engine and an axis of rotation of a rotor shaft of the generator are colinear.

18. The generator set of claim 8, wherein the ring gear has a plurality of bolt holes that align with a plurality of bolt holes of the flywheel of the engine, and the bolt holes of the ring gear and the bolt holes of the flywheel receive a plurality of bolts that connect the ring gear onto the flywheel.

19. A powertrain for a series hybrid vehicle, the powertrain comprising:

a traction motor;

an electrical energy storage device for supplying electrical power to the traction motor; and a generator set for supplying power to at least one of the traction motor and the electrical energy storage device, the generator set comprising an engine, a generator, and a coupling arrangement which couples the engine to the generator, the coupling arrangement comprising a gearset, wherein:

the gearset is an epicyclic gearset comprising a ring gear, a sun gear, and one or more planetary gears;

an outer circumference of the ring gear is same as an outer circumference of a flywheel of the engine, and the ring gear is axially fixed at the outer circumference of the flywheel; and the sun gear is connected to the generator.

* * * * *